United States Patent [19]

Al-Jaroudi

[11] Patent Number: 4,785,627

[45] Date of Patent: Nov. 22, 1988

[54] DRIVE DEVICE

[75] Inventor: Mohammed Y. Al-Jaroudi, Stockholm, Sweden

[73] Assignee: International Business Machines Corporation, Armonk, N.Y.

[21] Appl. No.: 123,676

[22] Filed: Nov. 23, 1987

[30] Foreign Application Priority Data

Feb. 13, 1987 [SE] Sweden .................................. 8700599

[51] Int. Cl.⁴ .............................................. F03G 7/06
[52] U.S. Cl. .................................................... 60/527
[58] Field of Search .......................... 60/527, 528, 529

[56] References Cited

U.S. PATENT DOCUMENTS 4,010,612  3/1977  Sandoval ............................... 60/527
4,030,298  6/1977  Sandoval .

FOREIGN PATENT DOCUMENTS 1476719  7/1965  Fed. Rep. of Germany .
2072756  10/1981  United Kingdom .................. 60/527

Primary Examiner—Allen M. Ostrager
Attorney, Agent, or Firm—Joseph J. Connerton

[57] ABSTRACT

A drive device of the type utilizing the property of shape memory alloys comprising a first wheel (12) and a second wheel (16) drivingly coupled together by means of a wire loop (20) of a shape memory alloy and a generator and/or a fan (7) coupled as an integral part of the drive device in such a way that a forced cooling of the wire loop (20) is obtained.

3 Claims, 1 Drawing Sheet

DRIVE DEVICE

FIELD OF THE INVENTION

The present invention relates to a drive device and more particularly to a drive device comprising an element of shape memory alloy.

BACKGROUND OF THE INVENTION

It is known in the prior art to use so called shape memory alloys such as Nitinol in a thermobile engine. Such an engine is described in the article "The Thermobile Nitinol Engine" by Frederick E. Wang, Society of Automotive Engineers Inc., 1985, which article is incorporated in this application by reference. Nitinol is a nickel-titanium alloy having memorization properties.

A wire of a shape memory alloy can easily be deformed to any shape. However, when the wire is heated above a certain transition temperature, it assumes a rigidity and preset configuration. The transition temperature is determined by the composition of the alloy.

The driving device according to the above mentioned article consists of a wire loop of a shape memory alloy drivingly engaging two wheels having dissimilar diameters. The wire is heated above the transition temperature at the smaller wheel, thereby causing the wire to assume a straight shape and the wheel to rotate. The wire is then cooled below the transition temperature on its travel to the larger wheel. The thermobile, according to the referenced article, uses air as the cooling medium for the wire and some form of heat energy, such as hot water, for the heating medium. The disadvantage with a driving device of this kind is that the efficiency of cooling is low and therefore the RPM value is low.

SUMMARY OF THE INVENTION

The present invention is intended to remedy this drawback by coupling a fan to the driving device in such a way that the air flow caused by the rotation of the fan cools the wire below the transition temperature. Since the driving device can be mounted as an integral part of the generator/fan assembly which is to be driven, a very compact and low cost fan or generator assembly can be provided.

DETAILED DESCRIPTION OF THE INVENTION

Figure 1:
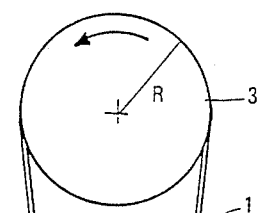
FIG. 1 illustrates a thermobile engine according to the above cited article.

Referring now to FIG. 1, there is illustrated a Thermobile Nitinol Engine of the type referenced in the Background of the Invention. The thermobile engine of FIG. 1 comprises a wire loop 1 drivingly engaging two wheels 2 and 3, the radius R of wheel 3 being greater than the radius r of wheel 2. The shape of the looped wire 1 at temperatures above its transition temperature is straight. Wheel 2 is partially immersed in hot water having a temperature considerably above the transition temperature of the Nitinol wire 1. As the wire segment moves from position (a) to (b), it is bent around wheel 2. At the same time, the wire segment is heated by coming into contact with the hot water as well as the hot wheel 2 as it moves on to (c). When the wire is heated above its transition temperature, it tries to regain its straight shape, taking the form depicted by the double dotted lines in FIG. 1. In taking this form, the wire creates a tugging force F along the loop 1 and brings a new wire segment into the hot water from position (a) to (b). Meanwhile, the original wire segment becomes straight as it moves from position (c) to position (d). When traveling from position (d) to the large wheel (3), the temperature of the wire segment again drops below the transition temperature. Thus, the force F keeps the wire loop moving, thereby providing a steady, continual rotating motion of the two wheels, from which mechanical energy can be extracted.

Figure 3:
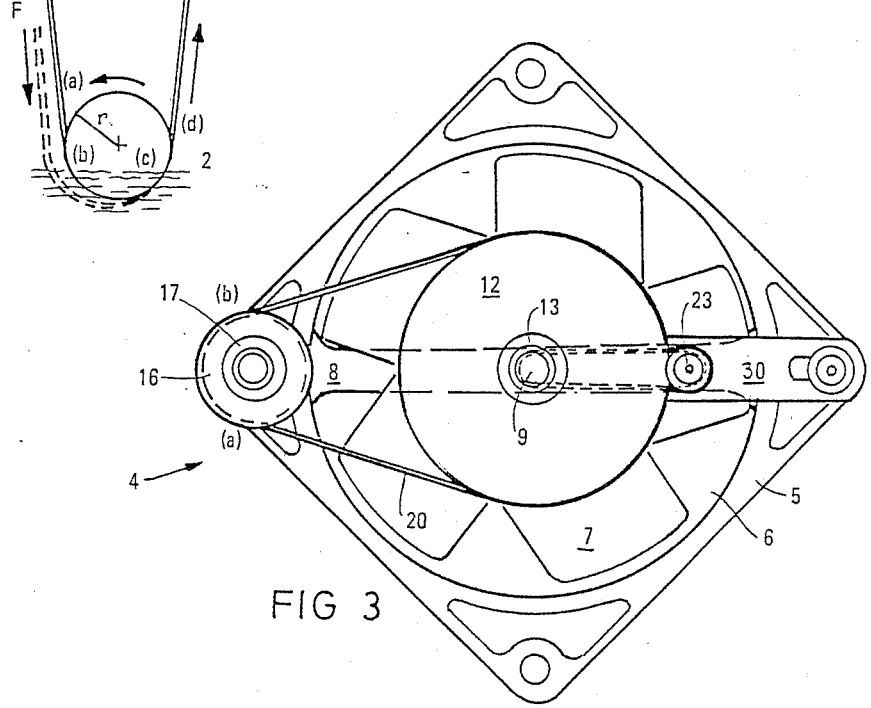
FIG. 3 is a top view of a generator/fan assembly with a driving device in accordance with the present invention.
Figure 2:
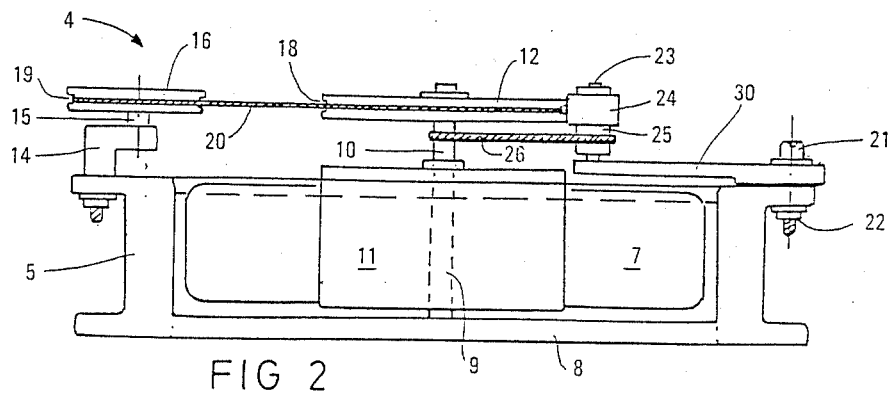
FIG. 2 is a side view of a generator/fan assembly with a driving device in accordance with the present invention.

The invention is described below with reference to FIGS. 2 and 3 which show side and top views respectively of the generator/fan assembly 4. Referring to FIG. 2, the fan assembly 4 consists of a frame 5 having a circular opening 6 housing a generator/fan assembly 7 and a cross beam 8 fixedly mounted on frame 5. The generator/fan assembly 7 is rotatably journaled in a first axle spindle 9, which in turn is fixedly mounted on cross beam 8. A second axle spindle 10 is fixedly mounted on the housing 11 of the generator/fan assembly 7. A first wheel 12 is journaled in a bearing 13 on the second axle spindle 10. A support 14, fastened to the frame 5 by means of a nut, is provided with a third axle spindle 15 on which a second wheel 16 is rotatably journaled in bearing 17. The first wheel 12 has a diameter substantially greater than the diameter of second wheel 16. The wheels 12 and 16 are provided with grooves 18 and 19 respectively extending peripherally in their outer cylindrical surfaces. A wire loop 20 of a memory-shape alloy fits into the grooves 18 and 19 and drivingly engages the two wheels 12 and 16. The support 14 is adjustable so that to provide the wire loop with a suitable stress. If the wire loop between parts (a) and (b) is exposed to a temperature above the transition temperature of the memory-shape alloy and the remainder of the loop is exposed to a temperature below that transition temperature, the combination of the two wheels 12 and 16 and the wire loop 20 will work as a thermobile engine, i.e., the wheels will rotate in one or the other direction.

The rotational movement of wheel 12 is transmitted by means of a gear mechanism to the axle spindle 10, thereby giving the generator/fan assembly a stepped-up rotational movement in the opposite direction. The air flow caused by the rotation of the fan 7 causes forced cooling of the wire loop 20. The gear mechanism consists of a support 30 which is mounted to the frame by means of a bolt 21 and a nut 22. The support 30 is provided with a fourth axle spindle 23 fixedly mounted thereto. A double-pulley 24,25 is rotatably journaled in bearings on the fourth axle spindle. The upper pulley 24 is in driving engagement with wheel 12, while the lower pulley 25 and the second axle spindle 10 are provided with grooves extending peripherally. A driving rope 26, which fits into said grooves, drivingly engages the pulley 25 and the axle spindle 10. As is readily apparent, the dimensioning of the fan 7 is dependent upon whether the assembly is used as a fan or as a generator. In the generator case, electrical power from the generator can be coupled through a cable (not shown) in an internal channel through the axle spindle 9 and the cross beam 8 to the outside of the assembly.

While the instant invention has been particularly shown and described with reference to a preferred embodiment thereof, it will be understood by those skilled in the art that various changes in form and detail may be made therein without departing from the spirit and the scope of the invention.

What is claimed is:

1. A generator/fan assembly for use in a thermobile engine comprising, in combination, first and second wheels of dissimilar diameters, a loop assembly comprising a shape memory alloy wire loop coupling said first and second wheels in a pulley configuration whereby motion of either said wheel will produce rotation of said loop assembly, said shape memory allow having a transition temperature above which it assumes a rigidity and predetermined configuration and below which it returns to a preset configuration, a heating medium for raising the temperature of a segment of said loop above said transition temperature, the deformation of said shape memory alloy and motion of said loop causing the rotation of said first and second wheels, and means for cooling said segment of said loop below its transition temperature as it moves beyond said heating medium to cause said segment to return to its preset configuration, said cooling means comprising a blade assembly coupled to the shaft of said second wheel which functions as a fan to cool the segments of said loop below said transition temperature.

2. A drive device according to claim 1, characterized in that said fan is coupled by means of a gear arrangement to said second wheel.

3. A drive device according to claim 2, characterized in that the housing of said fan includes an electric generator.

* * * * *